(12) United States Patent
Chiang et al.

(10) Patent No.: US 11,019,467 B2
(45) Date of Patent: May 25, 2021

(54) ADJUSTABLE SIP MUTE CALL AND ONE-WAY COMMUNICATION DETECTION AND REPORTING SYSTEMS AND METHODS

(71) Applicant: T-Mobile USA, Inc., Bellevue, WA (US)

(72) Inventors: Hsin-Fu Henry Chiang, Bellevue, WA (US); Muhammad Tawhidur Rahman, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 3 days.

(21) Appl. No.: 16/354,143

(22) Filed: Mar. 14, 2019

(65) Prior Publication Data
US 2020/0296554 A1  Sep. 17, 2020

(51) Int. Cl.
| | |
|---|---|
| *H04W 4/90* | (2018.01) |
| *H04W 4/16* | (2009.01) |
| *H04M 7/00* | (2006.01) |
| *H04W 4/06* | (2009.01) |
| *H04L 29/06* | (2006.01) |

(52) U.S. Cl.
CPC .......... *H04W 4/16* (2013.01); *H04L 65/1006* (2013.01); *H04M 7/006* (2013.01); *H04W 4/06* (2013.01); *H04W 4/90* (2018.02)

(58) Field of Classification Search
CPC .......... H04W 76/064; H04W 52/0254; H04W 76/28; H04W 76/30; H04W 76/50; H04W 76/10; H04W 4/16; H04W 4/06; H04W 4/90; H04L 43/10; H04L 43/0829; H04L 43/0852; H04L 65/1006; H04L 29/06; H04M 7/006
See application file for complete search history.

(56) References Cited

U.S. PATENT DOCUMENTS

| | | | | |
|---|---|---|---|---|
| 7,680,478 | B2 * | 3/2010 | Willars | H04L 65/1006 455/343.2 |
| 7,688,809 | B2 * | 3/2010 | Dendukuri | H04L 43/00 370/352 |
| 8,200,185 | B2 * | 6/2012 | Edge | H04W 76/50 455/404.1 |
| 9,974,467 | B2 * | 5/2018 | Blahnik | A61B 5/1112 |
| 9,999,095 | B2 * | 6/2018 | Kweon | H04W 52/0254 |
| 10,057,939 | B2 * | 8/2018 | Sharma | H04W 76/25 |
| 10,485,050 | B2 * | 11/2019 | Chinthalapudi | H04W 76/25 |

(Continued)

*Primary Examiner* — Hanh N Nguyen
(74) *Attorney, Agent, or Firm* — Perkins Coie LLP

(57) ABSTRACT

Systems and methods for maintaining and dynamically updating an inactivity timer at a user equipment to detect a one-way audio or mute call to improve call experience are disclosed. The method enables the user equipment to perform an action (e.g., enable, disable, drop call, don't drop call, etc.) when a one-way audio or mute call is detected. Instead of hardcoding values for the timer and/or action parameters within the user equipment (for example, by an original equipment manufacturer (OEM)), these parameter values can be dynamically determined and communicated to the user equipment by a telecommunications service provider based on one or more of the following factors: network health, network congestion, current events, type of call (emergency v. non-emergency), type of customer (business, premium, residential, etc.), service-level agreement, and so on.

20 Claims, 7 Drawing Sheets

(56) References Cited

U.S. PATENT DOCUMENTS

| | | | |
|---|---|---|---|
| 10,715,281 B2 * | 7/2020 | Loehr | H04L 1/1883 |
| 10,798,732 B2 * | 10/2020 | Park | H04W 72/14 |
| 2008/0198871 A1 * | 8/2008 | Shahidi | H04W 76/38 |
| | | | 370/465 |
| 2011/0150202 A1 * | 6/2011 | Cheng | H04M 3/432 |
| | | | 379/207.03 |
| 2017/0150549 A1 * | 5/2017 | Olsson | H04W 8/02 |
| 2020/0204676 A1 * | 6/2020 | Chiang | H04M 1/82 |

* cited by examiner

Media inactivity timers table

| Id 505 | Name 510 | Status 515 | Initial Value 520 | Current Value 525 | Default Value 530 | Action 535 |
|---|---|---|---|---|---|---|
| t1 | Emergency audio call | active | 5 sec. | 5 sec. | 7 sec. | A1 |
| t2 | Non-emergency audio call | active | 10 sec. | 15 sec. | 10 sec. | A6 |
| t3 | Video chat | inactive | 20 sec. | 10 sec. | 15 sec. | A3 |
| ⋮ | | | | | | |

*FIG. 5A*

Media inactivity timers table

| Id 540 | Name 545 | Value 550 | Start Time 555 | End Time 560 | Action 565 |
|---|---|---|---|---|---|
| t1 | Emergency audio call | 5 sec. | 01012018 0:05 hrs. | 01312018 11:59 hrs. | A1 |
| t2 | Emergency audio call | 7 sec. | 02012018 0:00 hrs. | | A2 |
| t3 | Video chat | 15 sec. | 01012018 05:00 hrs. | 01202018 05:00 hrs. | A3 |
| ⋮ | | | | | |

*FIG. 5B*

Media inactivity timers expiry actions table

| Action Id 605 | Action Name 610 | Customer Priority 615 | Location of User Equipment 620 | ... | Action 625 |
|---|---|---|---|---|---|
| A1 | Regular customer emergency audio call | 3 | Home | ... | Do nothing during call when user terminates call, UE shall give Release cause value=2 Reason: "user ends call RTP/RTCP timeout" |
| A1 | Premium customer emergency audio call | 1 | Roaming | ... | End call and give Release cause value=4 Reason: "RTP/RTCP timeout" |
| ... | | | | | |

FIG. 6

ADJUSTABLE SIP MUTE CALL AND ONE-WAY COMMUNICATION DETECTION AND REPORTING SYSTEMS AND METHODS

BACKGROUND

One-way or no-way audio problems occur when one (or both) parties cannot hear the other party. One-way communication is communication in which information is transmitted in only one direction. No-way communication is communication in which information is not transmitted in either direction. One-way or no-way audio problems are typically indicative of something stopping either the outbound or inbound communication (for example, audio) from reaching the receiving party. They can be caused by network issues, Network Address Translation (NAT) issues, mobility issues, handover issues, firewalls, incompatible codecs, and so on. For example, in Voice over Internet Protocol (VoIP), communication travels over the Internet in packets using Real-Time Transport Protocol (RTP). Since the packets are traveling through the Internet, they must pass through firewalls and network address translation. Due to the tricky nature of firewalls, a common complaint of customers and installers alike is that either the caller or callee cannot hear the other party. One-way or no-way audio problems result in a degraded customer experience and are a leading cause of complaints by customers to their telecommunications service providers. Existing solutions to detect one-way or no-way audio problems operate on a telecommunications network side and as a result, add significant delay in detecting and correcting these problems.

BRIEF DESCRIPTION OF THE DRAWINGS

FIGS. 5A-5B illustrate example data structures to store information about various media inactivity timers according to various implementations.

FIG. 6 illustrates an example data structure to store information about actions associated with media inactivity timers according to various implementations.

Figure 1:
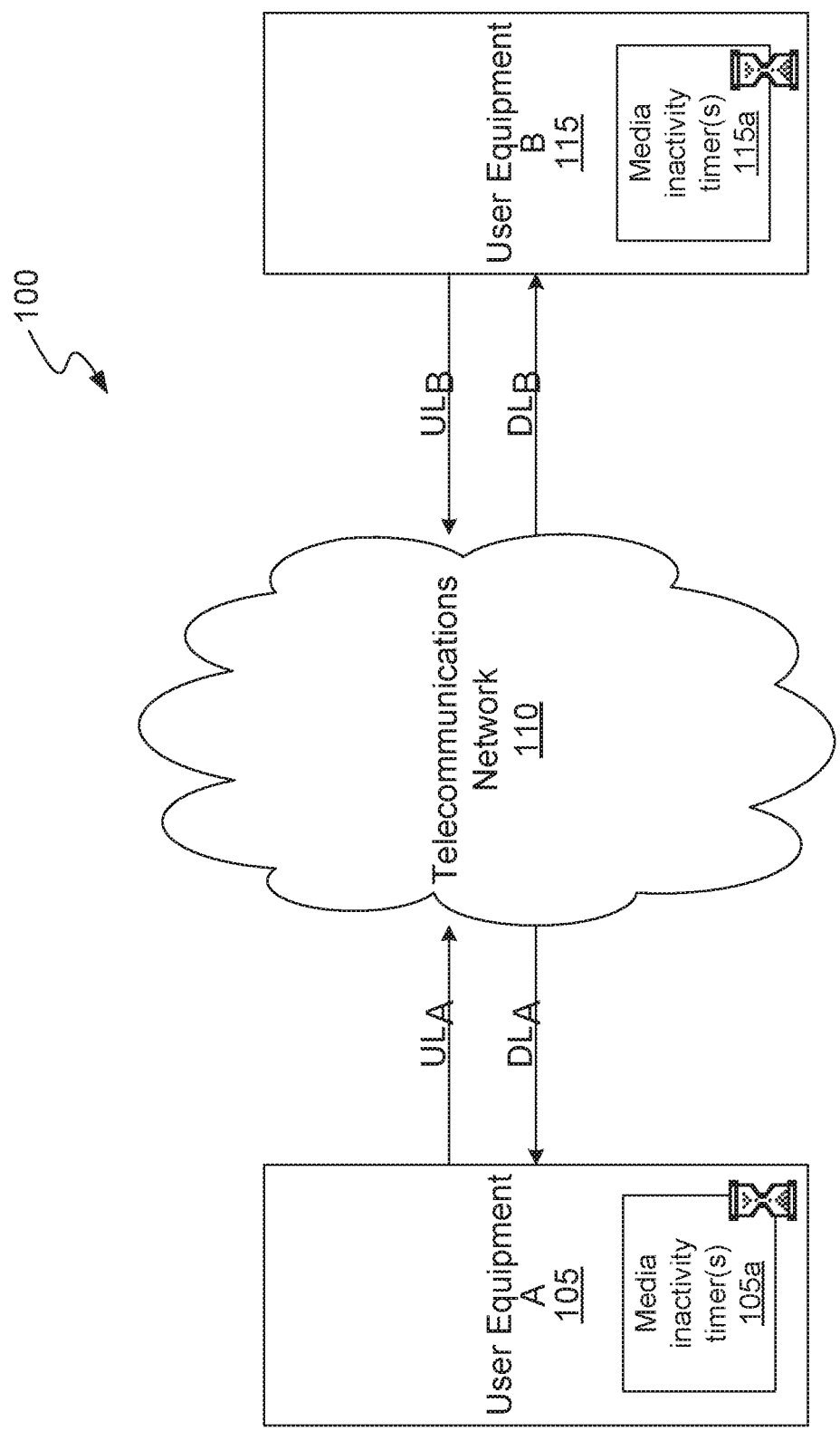
FIG. 1 illustrates an example of an environment in which some implementations of the present technology can be utilized.

The drawings have not necessarily been drawn to scale. Similarly, some components and/or operations can be separated into different blocks or combined into a single block for the purposes of discussion of some of the implementations of the present technology. Moreover, while the technology is amenable to various modifications and alternative forms, specific implementations have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

DETAILED DESCRIPTION

Since one-way or no-way communication problems are a leading cause of dissatisfaction with a telecommunications service provider, it is desirable to detect these problems as soon as possible so that corrective actions can be performed in a timely manner. Systems and methods for efficiently detecting one-way or no-way communication between user equipment devices are described herein. Communication problems can include problems related to audio, video, text, multimedia, and so on. Since most one-way or no-way communication problems occur at a user equipment, the systems and methods described herein maintain media inactivity timers at user equipment so that such problems can be detected early and with greater efficacy and accuracy. Moreover, by enabling periodic updates of the values of these media inactivity timers (for example, by a telecommunications service provider), the systems and methods provide better control, flexibility, optimization, and management in detection and correction of communication problems in a timely and cost-effective manner.

Various implementations discussed below address different aspects of media inactivity timers to detect one-way or no-way communication problems between one or more user equipment and/or telecommunication networks. Values of media inactivity timers can be stored at each user equipment and can be periodically updated by, for example, a telecommunications service provider. For example, a telecommunications service provider can send periodic (daily, weekly, monthly, quarterly, yearly, event-driven frequency, and so on) updates to one or more of the media inactivity timers stored at the user equipment. User equipment can maintain multiple media inactivity timers for different types of communication (for example, audio, video, text, multimedia, and so on), severity of communication (for example, emergency, non-emergency, and so on), and various other factors discussed below. Upon detecting a problem, the systems and methods enable the user equipment to perform actions to mitigate and/or correct the identified problems. The actions performed by the user equipment and their associated priority can be stored at each user equipment and can also be periodically updated by, for example, a telecommunications service provider. User equipment can maintain different actions for different media inactivity timers. For example, user equipment can store a more severe action (higher priority) for a media inactivity timer for emergency audio calls and a lower severity action (lower priority) for a media inactivity timer for non-emergency audio calls.

In the following description, for the purposes of explanation, numerous specific details are set forth in order to provide a thorough understanding of implementations of the present technology. It will be apparent, however, to one skilled in the art that implementations of the present technology can be practiced without some of these specific details.

The techniques introduced here can be implemented as special-purpose hardware (for example, circuitry), as programmable circuitry appropriately programmed with software and/or firmware, or as a combination of special-purpose and programmable circuitry. Hence, implementations can include a machine-readable medium having stored thereon instructions which can be used to program a computer (or other electronic devices) to perform a process. The machine-readable medium can include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other types of media/machine-readable medium suitable for storing electronic instructions.

The phrases "in some implementations," "according to some implementations," "in the implementations shown," "in other implementations," and the like generally mean the particular feature, structure, or characteristic following the phrase is included in at least one implementation of the present technology, and can be included in more than one implementation. In addition, such phrases do not necessarily refer to the same implementations or different implementations.

FIG. 1 illustrates an example of an environment 100 in which some implementations of the present technology can be utilized. As illustrated in FIG. 1, environment 100 comprises two user equipment devices 105 and 115 connected via a telecommunications network 110. In some cases, telecommunications network 110 can comprise multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. Telecommunications network 110 can also include third-party communications networks such as a Global System for Mobile (GSM) mobile communications network, a code/time division multiple access (CDMA/TDMA) mobile communications network, a 3rd, 4th or 5th generation (3G/4G/5G) mobile communications network (for example, General Packet Radio Service (GPRS/EGPRS), Enhanced Data rates for GSM Evolution (EDGE), Universal Mobile Telecommunications System (UMTS), or Long Term Evolution (LTE) networks), or other communications networks.

Examples of user equipment include, but are not limited to mobile devices (for example, mobile phones, tablets, laptops, and so on), Internet of Things (IoT) devices, smart devices (for example, wearable technology devices such as a smart watch, smart glasses, and so on), security devices (for example, anti-theft/anti-privacy breach devices operated by security operators), and so on. Each user equipment 105 and 115 can communicate in downlink and/or uplink directions with the telecommunications network 110. Each user equipment 105 and 115 maintains its own configurable set of media inactivity timers 105a and 115a respectively. The set of media inactivity timers comprise one or more media inactivity timers associated with different types of communications (for example, audio, video, text, chat, multimedia, and so on), subscriber relationships (for example, business account holder, home account holder, and so on), level of service with the telecommunications service provider (for example, premium customer, ultra-premium customer, and so on), geography of service, home location of user equipment, and so on.

Timers in the set of media inactivity timers can each be associated with a default value, an initial value, and a current value. These values can be based on several factors including, but not limited to, a type of communication (for example, audio, video, text, chat, multimedia, and so on), urgency of communication (emergency, non-emergency, and so on), subscriber relationship (for example, business account holder, home account holder, and so on), level of service with the telecommunications service provider (for example, premium customer, ultra-premium customer, and so on), geography of service, home location of user equipment, current location of user equipment, payment history of subscriber, network health, network congestion, current events, and other factors. In some implementations, a value for a media inactivity timer can be valid for a certain time period, after which the value can be updated to a second different value (for example, the default value). For example, when network congestion is increasing, the value of a non-emergency audio call inactivity timer can be set to a value higher than it would normally be set when there is no or minimal network congestion.

FIGS. 5A-5B illustrate example data structures to store the following information about various media inactivity timers: identifier 505 and 540, name 510 and 545, status 515, initial value 520, current value 525, default value 530, value 550, associated action 535 and 565, start time 555, end time 560, and so on. In some implementations, the start time 555 and end time 560 can be used by the user equipment to determine a currently active media inactivity timer and its associated value and actions. For example, as illustrated in FIG. 5B, the data structure includes two entries for the same timer identifier t1. Based on the current date and time, the user equipment can select one of the two entries for timer identifier t1, and detect and report inactivity accordingly.

In addition, each media inactivity timer can be associated with a configurable set of actions to be performed by the user equipment when the timer value expires. The set of actions associated with a media inactivity timer can be based on one or more of the factors discussed above in relation to media inactivity timer values. In some implementations, the same set of actions applies to all media inactivity timers at a user equipment. The actions can also be associated with priority levels such that actions are performed in increasing (or decreasing) order of priority. For example, different timer values and actions can be associated with different types of voice calls (emergency versus non-emergency). For an emergency call, a shorter media inactivity timer value can be used and an associated action can comprise the following operations: prompting the user to determine if the user wants to redial the call and if the user selects "yes," the user equipment selects a different radio access technology (RAT) for the call. For a non-emergency call, a longer media inactivity timer value can be used and an associated action can comprise the following operations: terminating the call by the user equipment. As another example, the same timer values but different actions can be associated based on a location of the user equipment. When the user equipment is connected to a home network, an associated action can comprise the following operations: delay in action to send a release reason cause at the time the user presses the end-bottom, which help network tracks KPI. When the user equipment is connected to a roaming network, an associated action can comprise the following operations: terminating the call by the user equipment.

FIG. 6 illustrates an example data structure to store the following information about actions associated with media inactivity timers: action identifier 605, action name 610, customer priority 615, location of user equipment 620, action to be performed 625, and so on. In some implementations, the user equipment can select an appropriate action based on one or more of the factors discussed above in relation to media inactivity timer values. For example, as illustrated in FIG. 6, the data structure includes two entries for the same action A1. Based on the customer priority and location of the user equipment, the user equipment can select one of the two entries for action A1, and perform the associated action 625.

Each user equipment stores values for and monitors current states of its media inactivity timers to detect communication inactivity and take appropriate responsive action(s). For example, after call setup, user equipment 105*a* can start a media inactivity timer 105*a* when it detects inactivity in either (or both) the uplink and the downlink. While continuing to detect inactivity, when user equipment 105 further detects that its media inactivity timer 105*a* has expired (for example, value of the timer has exceeded a certain threshold value stored at the user equipment), user equipment 105 can send a message to the telecommunications network 110 to terminate the communication.

Figure 2A:
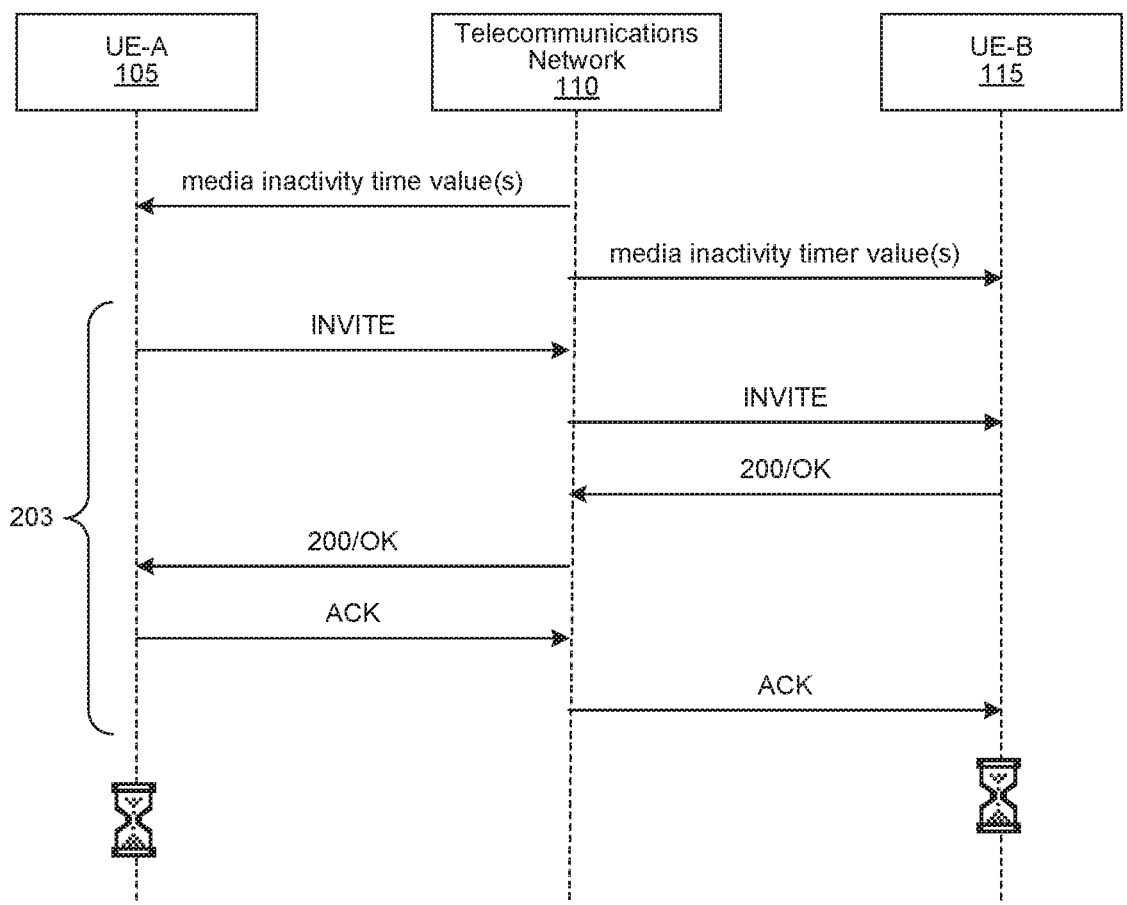
FIG. 2A is a flow diagram illustrating a set of operations for storing media inactivity timer values according to various implementations.

FIG. 2A is a flow diagram illustrating a set of operations for storing media inactivity timer values at user equipment according to various implementations. User equipment (for example, UE-A 105) can request updates from the telecommunication network 110 to a configurable set of media inactivity timers, associated configurable threshold values for the timers, and/or a configurable set of actions to be performed when a corresponding timer value expires. In some implementations, telecommunications network 110 can periodically (for example, at a certain frequency) send these updates to the user equipment. As illustrated in FIG. 2A, either in response to a user request (pull) and/or at periodic time intervals (push), telecommunications network 110 transmits, to the user equipment 105 and 115, a configurable set containing media inactivity timers, their associated values and/or their associated actions. Telecommunications network 110 can transmit this information via, for example, Non-Access Stratum (NAS) layer messages, Session Initiation Protocol (SIP) layer messages, Over-the-Air (OTA) messages, and so on. Telecommunications network 110 can transmit an initial set of media inactivity timers and their associated values and/or actions as part of an Initial-UEMessage sent to the user equipment UE-A 105. Telecommunications network 110 can update the media inactivity timers in the set of timers, for example by adding, deleting, and/or renaming the media inactivity timers. For example, telecommunications network 110 initially sends to user equipment UE-A 105 a set of media inactivity timers that include initial and default values for only an emergency audio call inactivity timer. At a later time, telecommunications network 110 sends a NAS layer message to UE-A 105 that adds a non-emergency audio call inactivity timer to the set of media inactivity timers at UE-A 105, and provides initial and default values for the newly added timer. User equipment UE-A 105 can store some or all of the received media inactivity timers and their associated values and actions in memory, at a remote location accessible via a network (for example, at a cloud server accessible over the Internet, at a removable storage medium, and so on), in a subscriber identity module (SIM) card (for example, SIM, iSIM, eSIM, and so on), and other such media. As will be described in detail below, user equipment 105 can then use the media inactivity timers to detect communication inactivity, for example, during an audio call setup using set of illustrated steps 203.

Figure 2B:
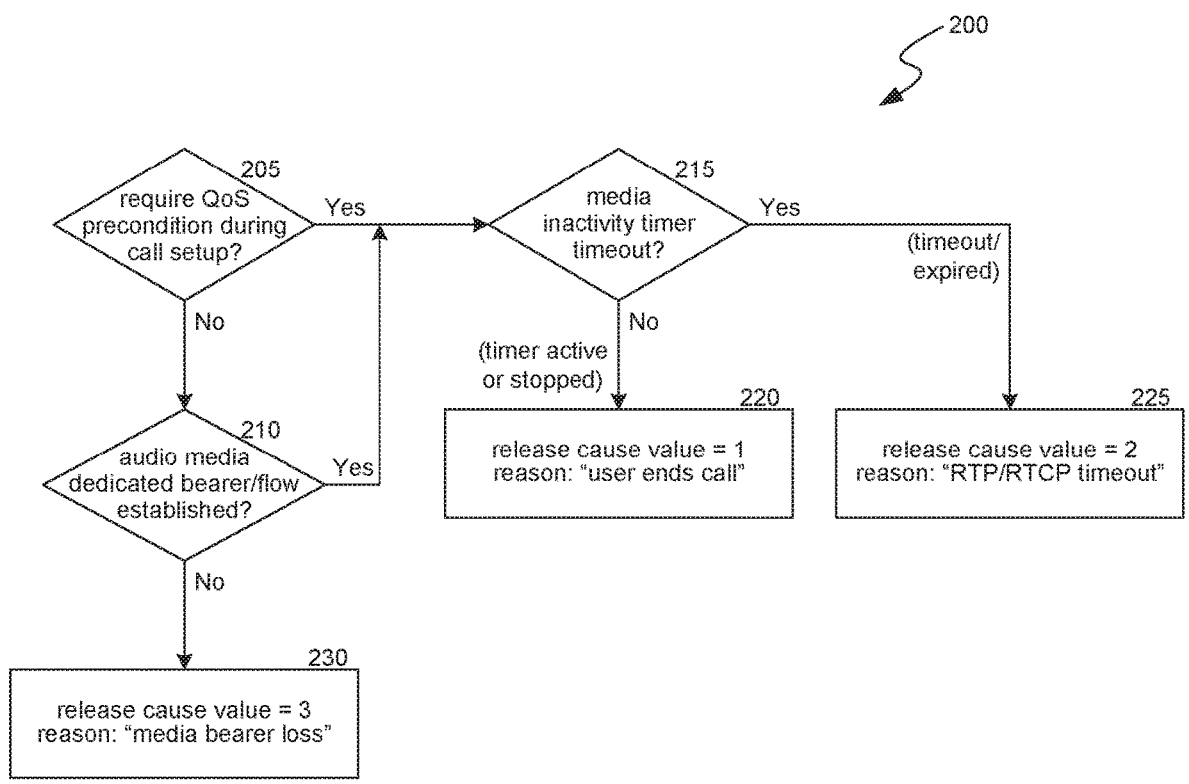
FIG. 2B is a flow diagram illustrating a set of operations for detecting a one-way or no-way audio problem according to various implementations.

FIG. 2B is a flow diagram illustrating a set of operations 200 for detecting a one-way or no-way audio problem according to various implementations. The set of operations 200 can be performed at an originating terminal, a destination terminal, or both. At block 205, process 200 determines whether a quality of service precondition is required during call setup. A quality of service precondition is typically a network resource reservation acknowledgement procedure by which terminal users (for example, UE-A 105 and UE-B 115) can establish a specific QoS class of identifier (QCI) before going to the ringing state. When no quality of service precondition is required, process 200 determines, at block 210 whether communication flow between the terminal users is established. For example, process 200 determines whether dedicated audio media flow is established between UE-A and UE-B. When communication flow between the terminal users is not established (for example, when user ends the call), the user equipment sends a message to the telecommunication network with the reason header cause value as 3 and reason text as "media bearer loss" (block 230).

When either the quality of service precondition is satisfied (at block 205) or communication flow between the terminal users is established (at block 210), process 200 proceeds to block 215 where it evaluates whether one or more timers in the configurable set of media inactivity timers at the user equipment have expired. For example, based on the type of communication (e.g., emergency audio call), the user equipment can retrieve the value of a corresponding media inactivity timer (e.g., emergency audio call inactivity timer) to determine whether the current value of that timer has exceeded its corresponding threshold value. Upon determining that the timer has expired, at block 225, the user equipment executes an action associated with the media inactivity timer (for example, select and execute one or more actions from set of actions associated with a media inactivity timer). The user equipment can select actions from the set of actions associated with the media inactivity timer based on one or more of the factors discussed above in relation to media inactivity timer values. For example, the user equipment sends a message to the telecommunication network with the reason header cause value as 2 and reason text as "RTP/RTCP timeout." On the other hand, when the timer has not expired, and the user ends the call, the user equipment sends a message to the telecommunication network with the reason header cause value as 1 and reason text as "user ends call" (block 220).

Figure 3:
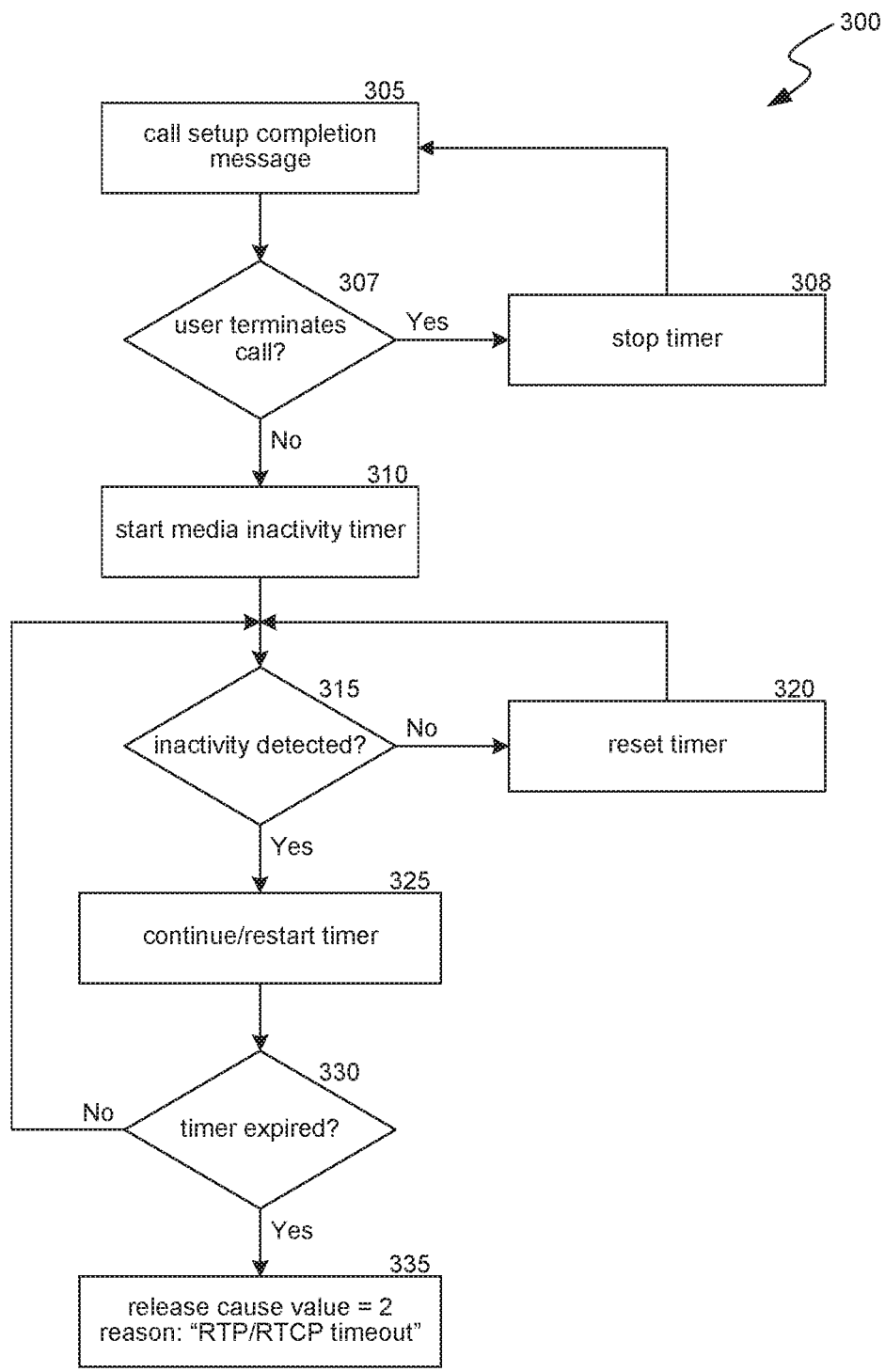
FIG. 3 is a flow diagram illustrating a set of operations for maintaining media inactivity timers according to various implementations.

FIG. 3 is a flow diagram illustrating a set of operations 300 for maintaining and operating media inactivity timer(s) according to various implementations. Process 300 begins at block 305 when it receives a call setup completion message (for example, after receiving ACK/ACK-200 messages, as depicted in FIG. 2A). If the user terminates the communication (for example, audio call) (block 307), process 300 stops any running timers (at block 308) and returns to block 305 to wait for another communication completion message. If the user does not terminate the communicate at block 307, process 300 proceeds to block 310 and starts the timers in the configurable set of media inactivity timers at the user equipment. In some implementations, process 300 selects to start some, but not all timers in the set of media inactivity timers at the user equipment based on one or more of the following factors: type of communication (for example, audio, video, text, chat, multimedia, and so on), urgency of communication (emergency, non-emergency, and so on), subscriber relationship (for example, business account holder, home account holder, and so on), level of service with the telecommunications service provider (for example, premium customer, ultra-premium customer, and so on), geography of service, home location of user equipment, current location of user equipment, payment history of subscriber, network health, network congestion, current events, and other factors. For example, when the communication request relates to an emergency audio call, process 300 can select to start only emergency audio call related timers. As another example, when the user equipment is associated with a subscriber who is classified as an ultra-premium customer by a telecommunication service provider, in addition to starting other typical timers (for example, a non-emergency audio call timer), process 300 can also select to start an ultra-premium customer media inactivity timer. The threshold value of the ultra-premium customer media inactivity timer can be set to a value that is lower than that of other timers so that process 300 can more quickly and efficiently detect inactivity and take appropriate actions for an ultra-premium customer, than it would for other regular customers. In this manner, process 300 can provide a tiered solution for detecting and reporting one-way or no-way communication that is based on a variety of factors discussed above. In some implementations, process 305 proceeds from block 307 to block 315, such that the activities performed at block 310 are instead performed at block 325 (discussed below).

Figure 4:
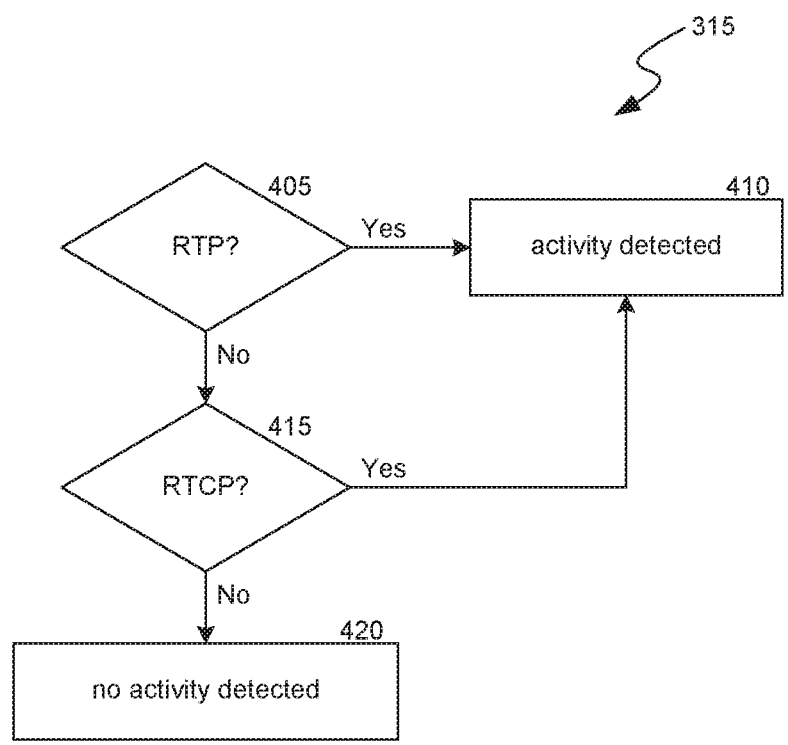
FIG. 4 is a flow diagram illustrating a set of operations for detecting communication inactivity according to various implementations.

At block 315, process 300 evaluates whether inactivity is detected by the user equipment. FIG. 4 is a flow diagram illustrating a set of operations performed at block 315 for detecting communication inactivity according to various implementations. The operations illustrated in FIG. 4 can be performed for the downlink, the uplink, or both. At blocks 405 and 415, process 315 evaluates whether Real-Time Transport Protocol (RTP) and/or RTP Control Protocol (RTCP) activity is detected in either the uplink or the downlink. If RTP inactivity and RTCP inactivity are detected in both the uplink and the downlink, then process 315 determines, at block 420 that no activity (that is, inactivity) is detected during communication (no-way communication). If RTP inactivity and RTCP inactivity are detected in one direction (for example, uplink), but either RTP activity or RTCP activity is detected in the other direction (for example, downlink), then process 315 determines, at block 420 that no activity (that is, inactivity) is detected during uplink communication (one-way communication) (and vice-versa). On the other hand, if either RTP activity or RTCP activity is detected in both directions (uplink and downlink), the process determines, at block 410 that activity is detected during communication.

Returning to FIG. 3, when block 315 does not detect inactivity in communication, it resets the values of the currently running timers in the set of media inactivity timers. But when inactivity is detected at block 315, process 300 starts relevant timers that are currently not running, and continues to run relevant timers that are currently running (block 325). For example, when process 300 identifies inactivity in both the uplink and the downlink during a non-emergency audio call, it can start (or continue running) a non-emergency media inactivity timer (FIG. 5A, t2) at block 325. At block 330, process 300 evaluates whether one or more of the running media inactivity timers have expired (that is, exceeded their current threshold values). For example, the media inactivity timer t1 illustrated in FIG. 5A will be considered to have expired when its value exceeds 5 seconds. As another example, given the current date and time (for example, if current date/time is Jan. 2, 2018, at 2:00 pm), the media inactivity timer t1 illustrated in FIG. 5B will be considered to have expired when its value exceeds 5 seconds. And if the current date and time is May 1, 2018, at 10:00 am, the media inactivity timer t1 illustrated in FIG. 5B will be considered to have expired when its value exceeds 7 seconds. When process 300 determines that the media inactivity timer has not expired, process 300 returns to block 315 where it continues to monitor for inactivity in relevant communication channels. On the other hand, when process 300 determines that the media inactivity timer has expired, it can select and perform one or more associated actions (block 335). For example, as illustrated in FIG. 3, at block 335, process 300, the user equipment does not perform any action during the call, but when the user terminates the call, the user equipment gives the RELEASE_CAUSE value 2, Reason: "RTP/RTCP timeout" (for example, to comply with 3GPP requirements). In some implementations, when the call termination is not user-initiated or sending BYE is not possible (for example, receiving SIP BYE, losing battery power, and so on), the timeout of the media inactivity timer has no associated action.

An example process flow executed by a user equipment according to some implementations is as follows:

ACK/ACK-200→Downlink (DL)→no RTP+no RTCP→inactivity→continue supervision timer

ACK/ACK-200→Uplink (UL)→no RTP+no RTCP→inactivity→continue supervision timer

DL (RTP and/or RTCP) & UP (RTP and/or RTCP)→activity→reset supervision timer

DL (RTP) & UP (RTP)→activity→reset supervision timer

DL (RTP) & UP (RTCP)→activity→reset supervision timer

DL (RTCP) & UP (RTP)→activity→reset supervision timer

DL (RTCP) & UP (RTCP)→activity→reset supervision timer

DL (RTP and/or RTCP) & UP (RTP and/or RTCP)→activity→reset supervision timer→(DL) no RTP+no RTCP→inactivity→restart supervision timer DL (RTP and/or RTCP) & UP (RTP and/or RTCP)→activity→reset supervision timer→(UL) no RTP+no RTCP→inactivity→restart supervision timer Conclusion Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of implementations of the system is not intended to be exhaustive or to limit the system to the precise form disclosed above. While specific implementations of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively, or additionally, network elements performing those functions could be replaced by two or more elements to perform portions of those functions. In addition, while processes, message/data flows, or blocks are presented in a given order, alternative implementations may perform routines having blocks, or employ systems having blocks, in a different order, and some processes or blocks may be deleted, moved, added, subdivided, combined, and/or modified to provide alternative or subcombinations. Each of these processes, message/data flows, or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the methods and system provided herein can be applied to other systems, not necessarily the system described above. The elements, blocks and acts of the various implementations described above can be combined to provide further implementations.

Any patents and applications and other references noted above, including any that may be listed in accompanying filing papers, are incorporated herein by reference. Aspects of the technology can be modified, if necessary, to employ the systems, functions, and concepts of the various references described above to provide yet further implementations of the technology.

These and other changes can be made to the invention in light of the above Detailed Description. While the above description describes certain implementations of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific implementations disclosed in the specification, unless the above Detailed Description section explicitly defines such terms. Accordingly, the actual scope of the invention encompasses not only the disclosed implementations, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as implemented in a computer-readable medium, other aspects may likewise be implemented in a computer-readable medium. Accordingly, the inventors reserve the right to add additional claims after filing the application to pursue such additional claim forms for other aspects of the technology.

The invention claimed is:

1. At least one computer-readable memory, excluding transitory signals, carrying instructions to be executed by at least one processor, wherein the instructions are for performing a method of detecting a one-way connection, the method comprising:
   receiving, at a mobile device, a set of configurable media inactivity timer values for the mobile device,
      wherein at least one configurable media inactivity timer value is configurable based in part on a location associated with the mobile device;
   storing, in at least one memory of the mobile device, a subset of the set of configurable media inactivity timer values;
   receiving, at the mobile device, a call setup completion message;
   detecting, at the mobile device, inactivity in both: (1) a downlink connection between the mobile device and a telecommunications service provider, and (2) an uplink connection between the mobile device and the telecommunications service provider;
   when inactivity is detected in both the downlink connection and the uplink connection:
      restarting, at the mobile device, at least one media inactivity timer;
      comparing a value of the at least one media inactivity timer with a corresponding value in the set of configurable media inactivity timer values for the mobile device; and
      when the value of the at least one media inactivity timer equals or exceeds the corresponding value in the set of configurable media inactivity timer values:
         executing, by the mobile device, at least one action associated with the at least one media inactivity timer; and
   when inactivity is not detected in either the downlink connection or the uplink connection:
      resetting, at the mobile device, a value of the at least one media inactivity timer.

2. The at least one computer-readable memory of claim 1 wherein the set of configurable media inactivity timer value is received from the telecommunications service provider, and wherein a user of the mobile device is subscribed with the telecommunications service provider.

3. The at least one computer-readable memory of claim 1 wherein the method further comprises:
   receiving a set of actions associated with each value in the set of configurable media inactivity timer values,
      wherein the at least one action executed by the mobile device is selected from the set of actions associated with the at least one media inactivity timer.

4. The at least one computer-readable memory of claim 1 wherein the set of configurable media inactivity timer values comprises a first inactivity timer value for an emergency call and a second inactivity timer value for a non-emergency call.

5. The at least one computer-readable memory of claim 1 wherein the set of configurable media inactivity timer values comprises a first inactivity timer value for an emergency call and a second inactivity timer value for a non-emergency call, and
   wherein the first inactivity timer value is associated with a first action and the second inactivity timer value is associated with a second action different from the first action.

6. The at least one computer-readable memory of claim 1 wherein the method further comprises:
   transmitting, from the mobile device, a request to the telecommunications service provider for the set of configurable media inactivity timer values,
      wherein a user of the mobile device is subscribed with the telecommunications service provider, and
      wherein the set of configurable media inactivity timer values for the mobile device is received by the mobile device in response to the transmitted request.

7. The at least one computer-readable memory of claim 1 wherein detecting inactivity in either the downlink connection or the uplink connection comprises:
   detecting, at the mobile device, no Real-time Transport Protocol (RTP) packet, and
   detecting, at the mobile device, no RTP Control Protocol (RTCP) packet.

8. The at least one computer-readable memory of claim 1 wherein the at least one media inactivity timer is started when the mobile device receives a Session Initiation Protocol (SIP) acknowledgment (ACK) message or a SIP ACK 200-OK message.

9. The at least one computer-readable memory of claim 1 wherein the at least one media inactivity timer is started when the mobile device receives the call setup completion message.

10. The at least one computer-readable memory of claim 1 wherein the set of configurable media inactivity timer values are received via at least one: Non-Access Stratum (NAS) layer message, Session Initiation Protocol (SIP) layer message, Over-the-Air (OTA) message, or any combination thereof.

11. The at least one computer-readable memory of claim 1 wherein the set of configurable media inactivity timer values are configured based on:
   network health,
   network congestion,
   current events,
   user-defined parameters,
   type of communication,
   type of audio call,
   user profile of user associated with the mobile device,
   subscriber plan associated with the mobile device,
   or any combination thereof.

12. The computer-readable memory of claim 1, wherein storing a subset of the set of configurable media inactivity timer values includes storing, in the at least one memory of the mobile device, a data structure configurable to store at least two of an initial value, a current value, or a default value for each configurable media inactivity timer value in the subset.

13. A method of detecting a one-way connection at a mobile device, the method comprising:
   receiving, at the mobile device, a set of configurable media inactivity timer values for the mobile device,
      wherein at least one configurable media inactivity timer value is configurable based in part on a location associated with the mobile device;
   receiving, at the mobile device, a communication completion message;
   upon detecting, at the mobile device, inactivity in at least one of a downlink connection and an uplink connection between the mobile device and a telecommunications service provider:
      restarting, at the mobile device, at least one media inactivity timer;
      comparing a value of the at least one media inactivity timer with a corresponding value in the set of configurable media inactivity timer values for the mobile device; and
      when the value of the at least one media inactivity timer is greater than the corresponding value in the set of configurable media inactivity timer values:
         executing, by the mobile device, at least one action associated with the at least one media inactivity timer.

14. The method of claim 13 further comprising:
   storing, in at least one memory configurably connected to the mobile device, a subset of the set of configurable media inactivity timer values.

15. The method of claim 13, wherein the set of configurable media inactivity timer values comprise a set of uplink media inactivity timer values for the uplink connection and a set of downlink media inactivity timer values for the downlink connection.

16. The method of claim 13 further comprising:
   when inactivity is not detected in at least one of the downlink connection and the uplink connection, resetting, at the mobile device, a value of the at least one media inactivity timer.

17. The method of claim 13, wherein the set of configurable media inactivity timer values is received from the telecommunications service provider, and wherein a user of the mobile device is subscribed with the telecommunications service provider, the method further comprising:
   receiving a set of actions associated with each value in the set of configurable media inactivity timer values,
      wherein the at least one action executed by the mobile device is selected from the set of actions associated with the at least one media inactivity timer.

18. The method of claim 13 wherein the set of configurable media inactivity timer values comprises a first inactivity timer value for an emergency call and a second inactivity timer value for a non-emergency call, and
   wherein the first inactivity timer value is associated with a first action and the second inactivity timer value is associated with a second action different from the first action.

19. A method of detecting a one-way connection at a mobile device, the method comprising:
   receiving, at the mobile device, a set of configurable media inactivity timer values for the mobile device,
      wherein each particular value in the set of configurable media inactivity timer values is associated with a set of actions to be performed when the particular value is exceeded, and
      wherein at least one configurable media inactivity timer value is configurable based in part on a location associated with the mobile device;
   upon detecting, at the mobile device, inactivity in at least one of a downlink connection and an uplink connection between the mobile device and a telecommunications service provider:
      restarting, at the mobile device, at least one media inactivity timer;
      comparing a value of the at least one media inactivity timer with a corresponding value in the set of configurable media inactivity timer values; and
      when the value of the at least one media inactivity timer exceeds the corresponding value in the set of configurable media inactivity timer values, executing, by the mobile device, at least one action in the set of actions associated with the corresponding value in the set of configurable media inactivity timer values.

20. The method of claim 19 wherein the set of configurable media inactivity timer values comprises a first inactivity timer value for an emergency call and a second inactivity timer value for a non-emergency call, and
   wherein the first inactivity timer value is associated with a first action and the second inactivity timer value is associated with a second action different from the first action.

* * * * *